US000001958H

(19) United States

(12) Statutory Invention Registration (10) Reg. No.: US H1958 H

Haeger et al. (43) Published: Apr. 3, 2001

(54) METHOD OF PROCESSING OCEAN PROFILE DATA USING INTERACTIVE GRAPHICAL TECHNIQUES

(75) Inventors: Steven D. Haeger, Pass Christian, MS (US); Dharmesh Krishnamaguru, Kitchener (CA); Ramesh Krishnammagaru, Mountain View, CA (US); James Corbin, Pearl River, LA (US)

(73) Assignee: The United States of America as represented by the Secretary of the Navy, Washington, DC (US)

(21) Appl. No.: 09/052,351

(22) Filed: Mar. 31, 1998

(51) Int. Cl.[7] ..... G06F 19/00

(52) U.S. Cl. ..... 702/2; 702/16; 707/102; 707/104

(58) Field of Search ..... 702/2, 14, 15, 702/16; 707/8, 10, 102, 104

(56) References Cited

U.S. PATENT DOCUMENTS 5,179,652 * 1/1993 Rozmanik et al. ..... 345/331
5,553,277 * 9/1996 Hirane et al. ..... 707/104
5,745,895 * 4/1998 Bingham et al. ..... 707/10
5,781,773 * 7/1998 Vanderpool et al. ..... 707/100
5,978,804 * 11/1999 Dietzman ..... 707/104

* cited by examiner

*Primary Examiner*—Daniel T. Pihulic
(74) *Attorney, Agent, or Firm*—Thomas E. McDonnell; Barry A. Edelberg

(57) ABSTRACT

An interactive data analysis system is disclosed that utilizes interactive graphic techniques to analyze ocean properties of a region of interest. The interactive system allows for a user to edit observed ocean data based on his/her a priori knowledge and insight so as to derive accurate ocean profile data.

2 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF PROCESSING OCEAN PROFILE DATA USING INTERACTIVE GRAPHICAL TECHNIQUES

BACKGROUND OF THE INVENTION

1. Field of the Invention

The present invention relates to a method of processing and analyzing ocean profile data. More particularly, the present invention relates to a method of processing and analyzing ocean properties of a region of interest so as to determine a target ocean profile by utilizing interactive graphic techniques and is particularly suited to handle data associated with shallow water regions that commonly encounter relatively high spatial and temporal variability of ocean properties.

2. Description of the Background Art

Processing and the analysis of ocean properties of interest including profile data are commonly performed by a combination of several computerized techniques: statistical models, physics-based models, non-graphical software (looking at numbers), and non-interactive graphical software. The first two techniques (statistical and physics-based models) are appropriate and adequate for certain applications. More particularly, these first two techniques (statistical and physics-based models) usually work best in deep water where the ocean is characterized by long spatial and temporal scales of variability relative to those of shallow water. The last two techniques (non-graphic and non-interactive software) are tedious, time consuming, and often non-intuitive. Of fundamental importance in any technique that may be used in the ability to "group appropriate" data together so as to derive statistics or to qualitatively describe ocean properties. For example, the perform quality control (editing) of observed ocean data, one must have a priori knowledge of what the ocean should look like at a particular location and time. Historical data must be appropriately grouped (providing a stationary basis) to learn this. The coastal ocean is too undersampled to provide this appropriate grouping with automated statistical techniques. It is desired that means be provided to allow appropriate grouping and editing of observed ocean data based on a priori knowledge and insight so as to derive accurate ocean profile data.

SUMMARY OF THE INVENTION

It is a primary object of the present invention to provide interactive graphic techniques to allow a back-and-forth dialogue with computer displays driven by appropriate operating routines for an oceanographer to process and analyze ocean properties including profile data of a region of interest.

It is another object of the present invention to process and analyze ocean profile data associated with shallow water in a relatively rapid manner.

Another object of the present invention is to provide an oceanographer with a method to design sampling strategy of ocean profiles for ship, aircraft, and submarine surveys.

A further object of the present invention is to provide an oceanographer with a method to edit observed ocean profile data (previously collected (historical) and near-real time).

A still further object of the present invention is to provide an oceanographer with a method to construct gridded climatological data bases of "synthetic" profiles.

In addition, it is an object of the present invention to provide a method that allows an oceanographer to analyze profiles and satellite-derived sea surface temperature for the production of paper and digital publications also associated with ocean profiles.

Moreover, an object of the present invention is to provide a method that allows an oceanographer to evaluate and modify 3-dimensional outputs of ocean thermal models in near-real time basis.

The invention is directed to a method of utilizing interactive graphic techniques for the analysis of ocean properties of a target region of interest.

The operator analyzes ocean data under consideration including temperature, salinity and other related properties such as sound speed, density and conductivity. The method employed by the operator comprises the steps of displaying, changing, and reviewing. The first step is displaying the ocean data under consideration. The next step is reviewing the originally displayed data by an operator employing deductive reasoning. The next step is changing the displayed data by interactive graphical techniques in response to the operator's deductive reasoning, and reviewing the changed displayed data by the operator employing deductive reasoning for a second time. The method continues to change the display data by the interactive graphical technique in response to the operator's deductive reasoning until the deductive reasoning of the operator determines that the display data satisfies the analysis expectation of the operator.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

Figure 1:
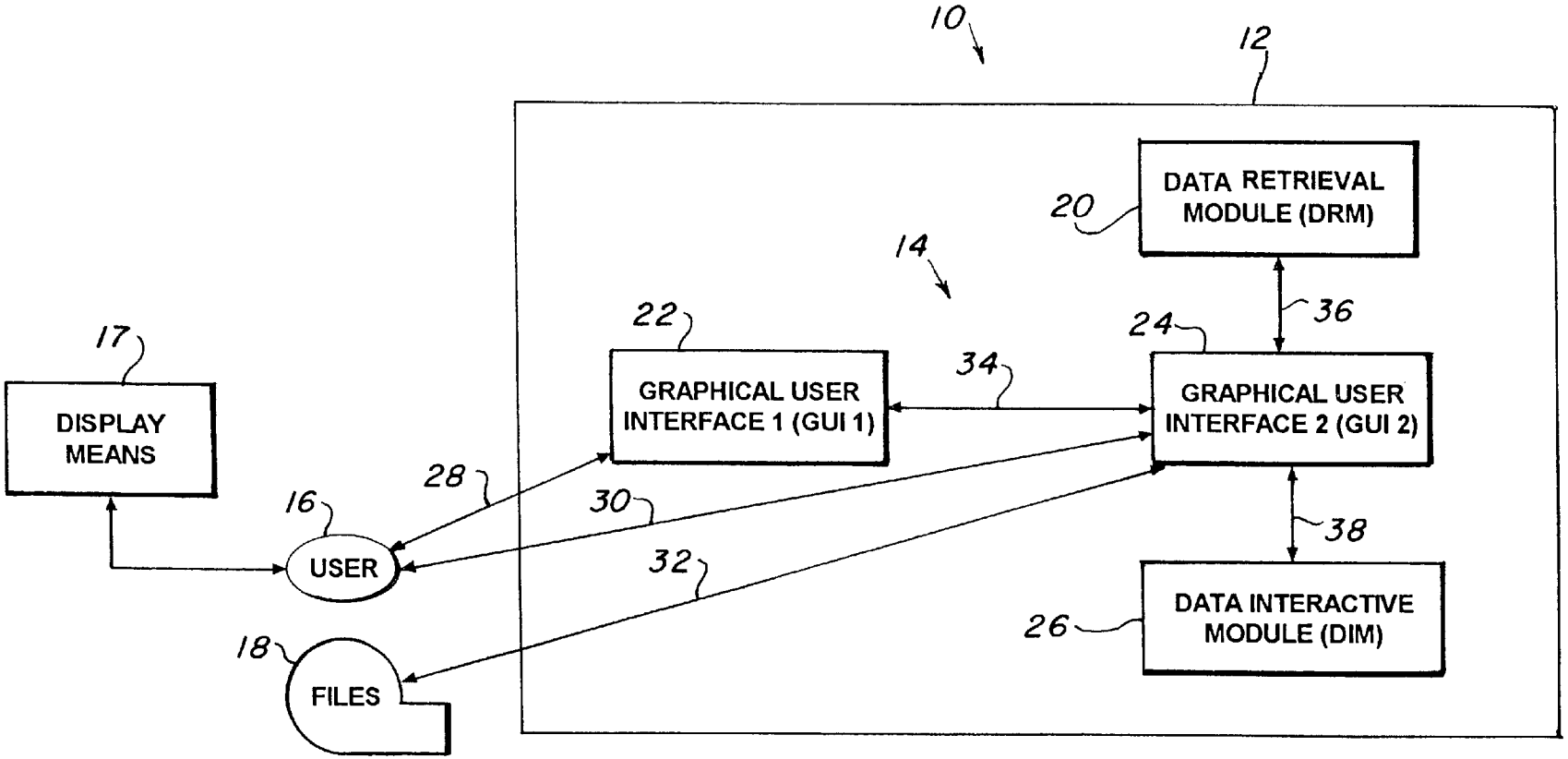
FIG. 1 is a block diagram illustrating the interrelationship of some of the elements of the present invention.

FIG. 1 is a block diagram of a Naval Interactive Data Analysis System (NIDAS) 10 comprising a computer 12 comprised of a hardware environment for the execution of a computer configuration operating routines 14 which interact with the user 16 and which provides analysis results which may be stored or accessed from files 18 on an accessible storage device, such as a magnetic disk. The user 16 interacts with an is prompted by interactive commands displayed on and commanded from the display means 17.

In the practice of the present invention, ocean related data including temperature, salinity and other related properties such as sound speed, density and conductivity are analyzed by an operator using his/her deductive reasoning in cooperation with interactive graphic techniques provided by computer routines of the present invention. The operator starts with visually reviewing on a display panel, the data under consideration and then uses his/her deductive reasoning to correlate or change the data and again visually reviews the data to determine, again using deductive reasoning, if the quality of the displayed data is improving relative to the initial display and, if improving, continues to correlate or change the data until the display data meets his/her analysis expectations so that the property of the ocean data under consideration is accurately analyzed.

The NIDAS 10 of the present invention provides for interactive overlay capability for several types of oceanographic, meteorological, and satellite defined data, and creates three-D gridded fields of temperature and salinity profiles constructed from a combination of user derived and gridded data. The operation of system 10, in one embodiment, provides a method of utilizing interactive graphic techniques for the analysis of ocean properties of a target region of interest. The system 10 provides a bank of data, (Master Oceanographic Observation Data Set) herein termed "MOODS," comprising observed ocean temperature and salinity profiles with the temperature profiles comprising sets of observations of temperature versus depth parameters collected nearly simultaneously. The data comprising the MOODS are random in space and time, are derived from various sources, and are of various quality. The system 10 further provides latitude, longitude and time (LLT) parameters having temporal boundaries and serving as a generic data catalog for ocean profiles. The LLT parameters can include MOODS profiles, observed profiles from sources other than MOODS, or ocean profiles generated from ocean models.

Figure 3B:
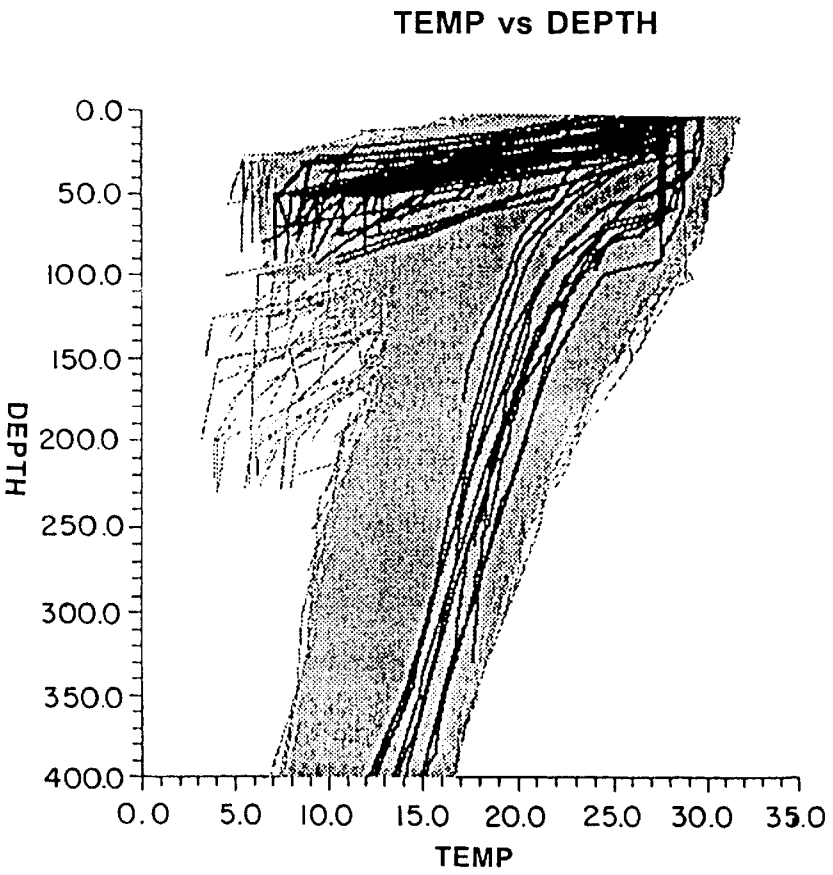
FIG. 3 illustrates the typical displays drawn on the display means related to the present invention.
Figure 3A:
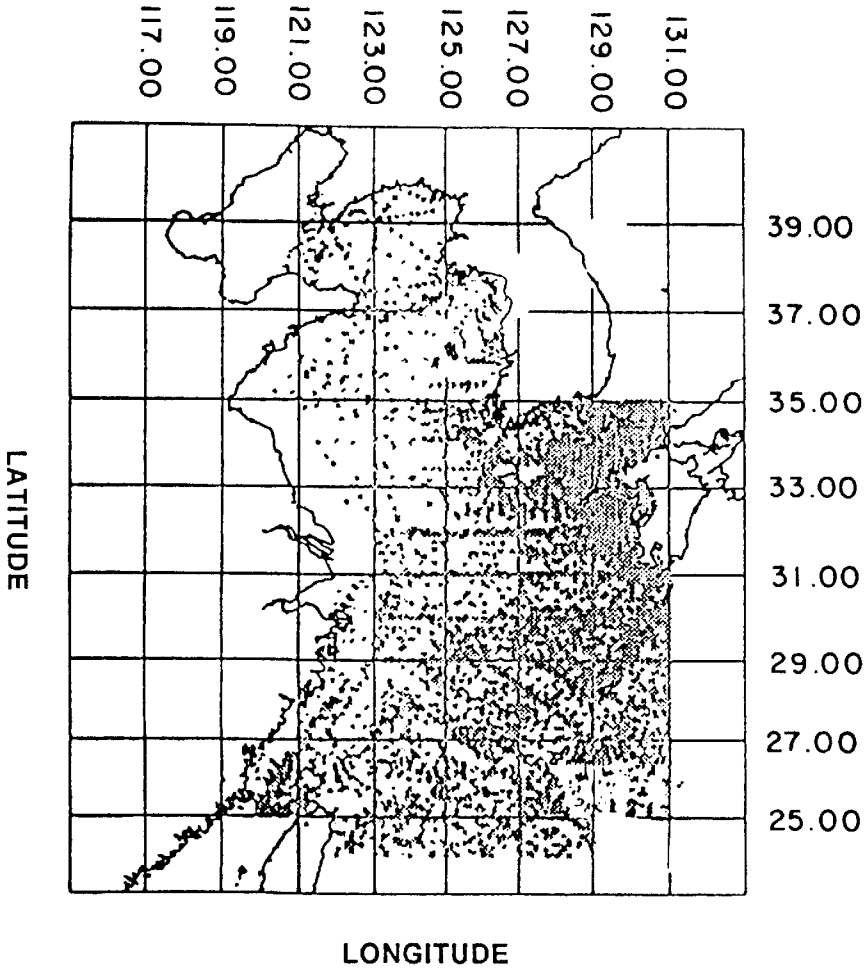
Figure 4A:
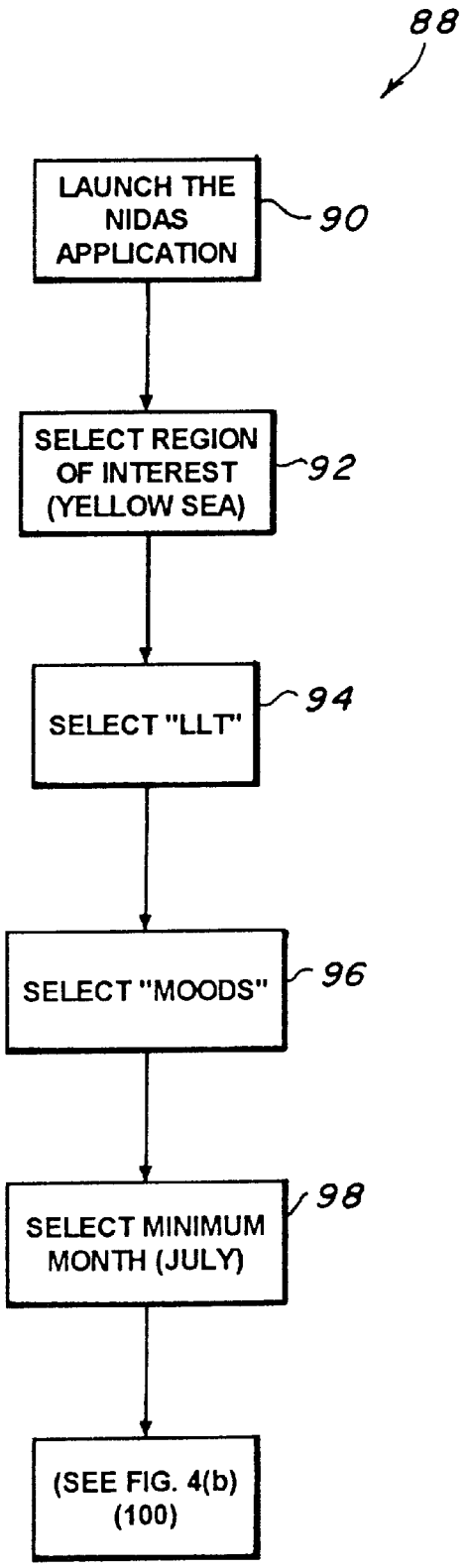
FIG. 4 is composed of FIGS. 4(*a*), 4(*b*), 4(*c*), 4(*d*), 4(*e*), 4(*f*) and 4(*g*), illustrating the flow charts related to three examples of interactive techniques of the present invention.
Figure 4B:
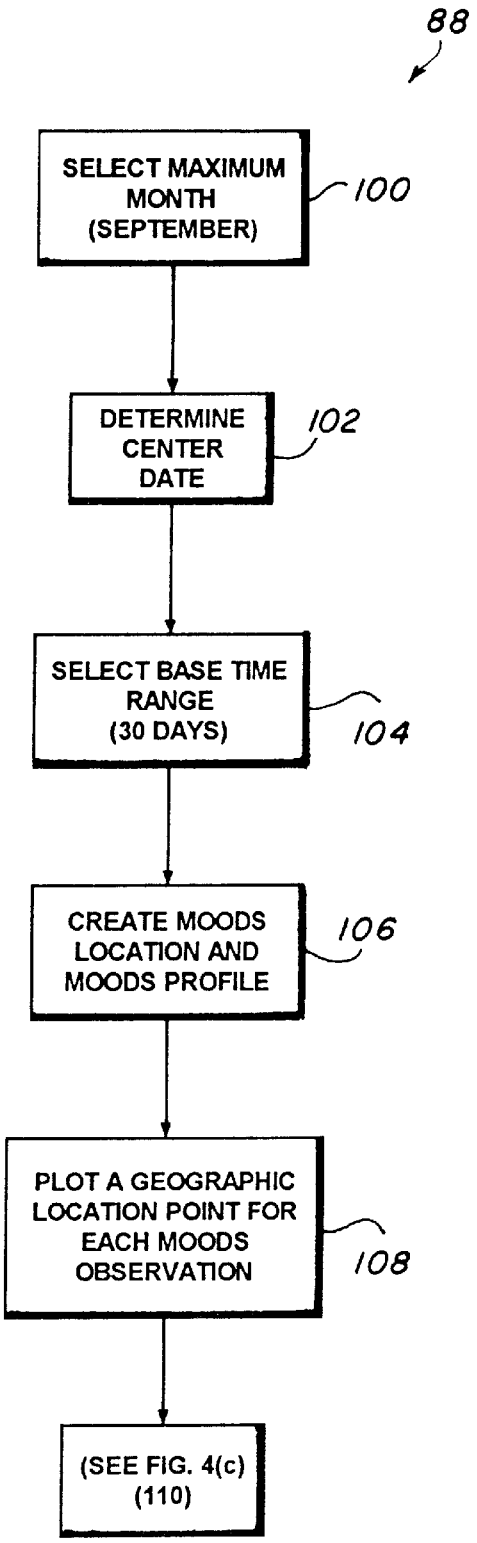
Figure 4C:
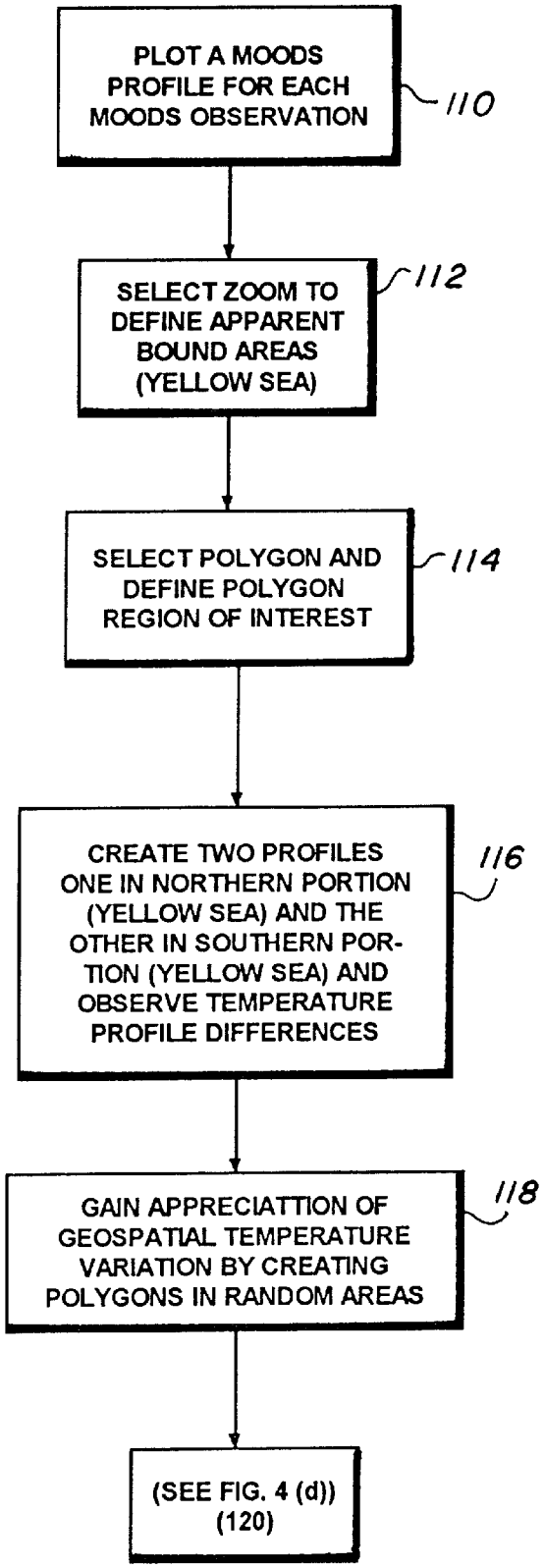
Figure 4D:
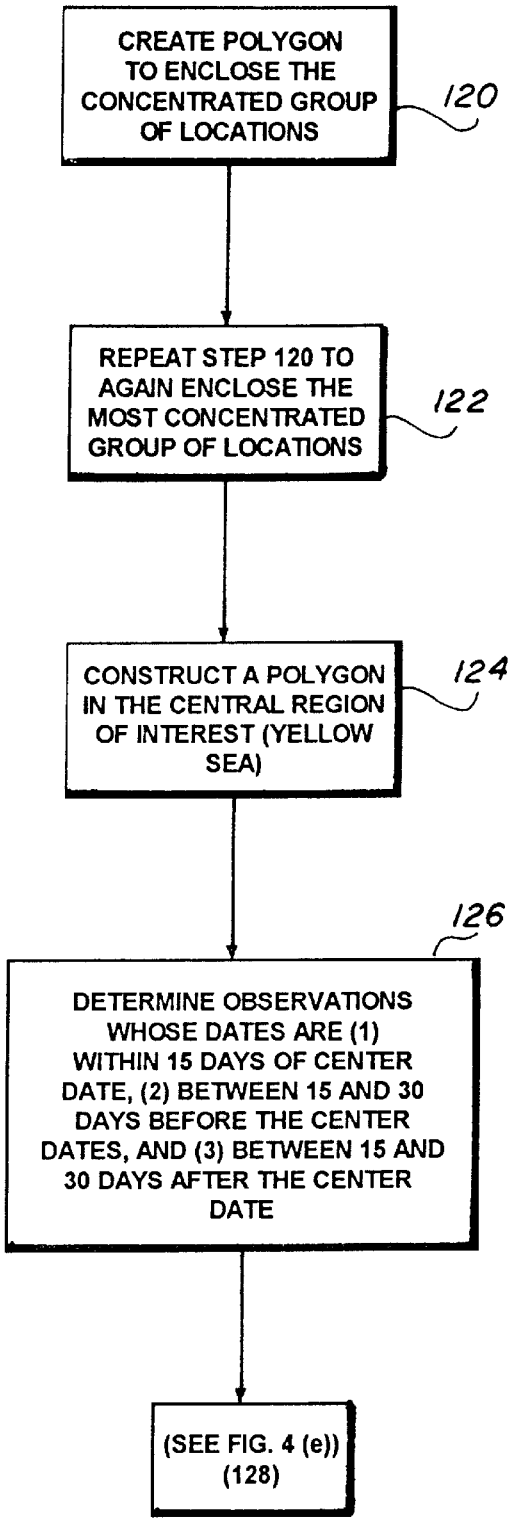
Figure 4E:
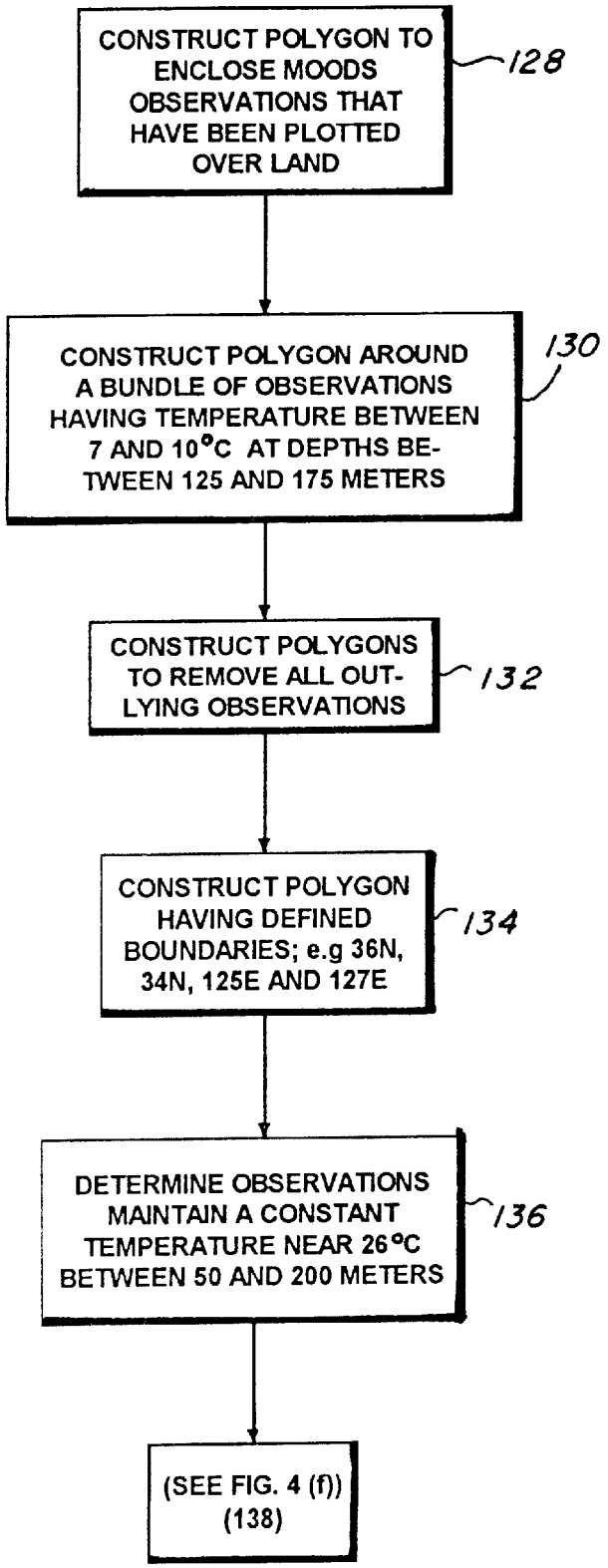
Figure 4F:
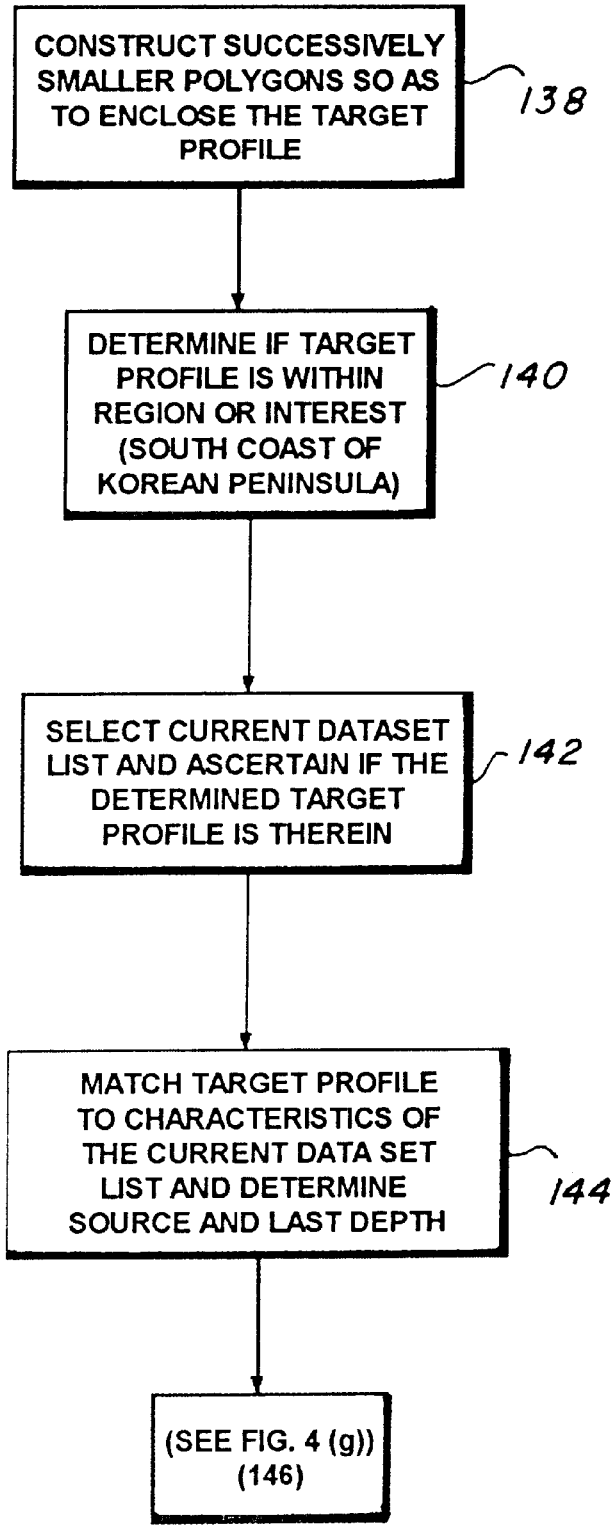
Figure 4G:
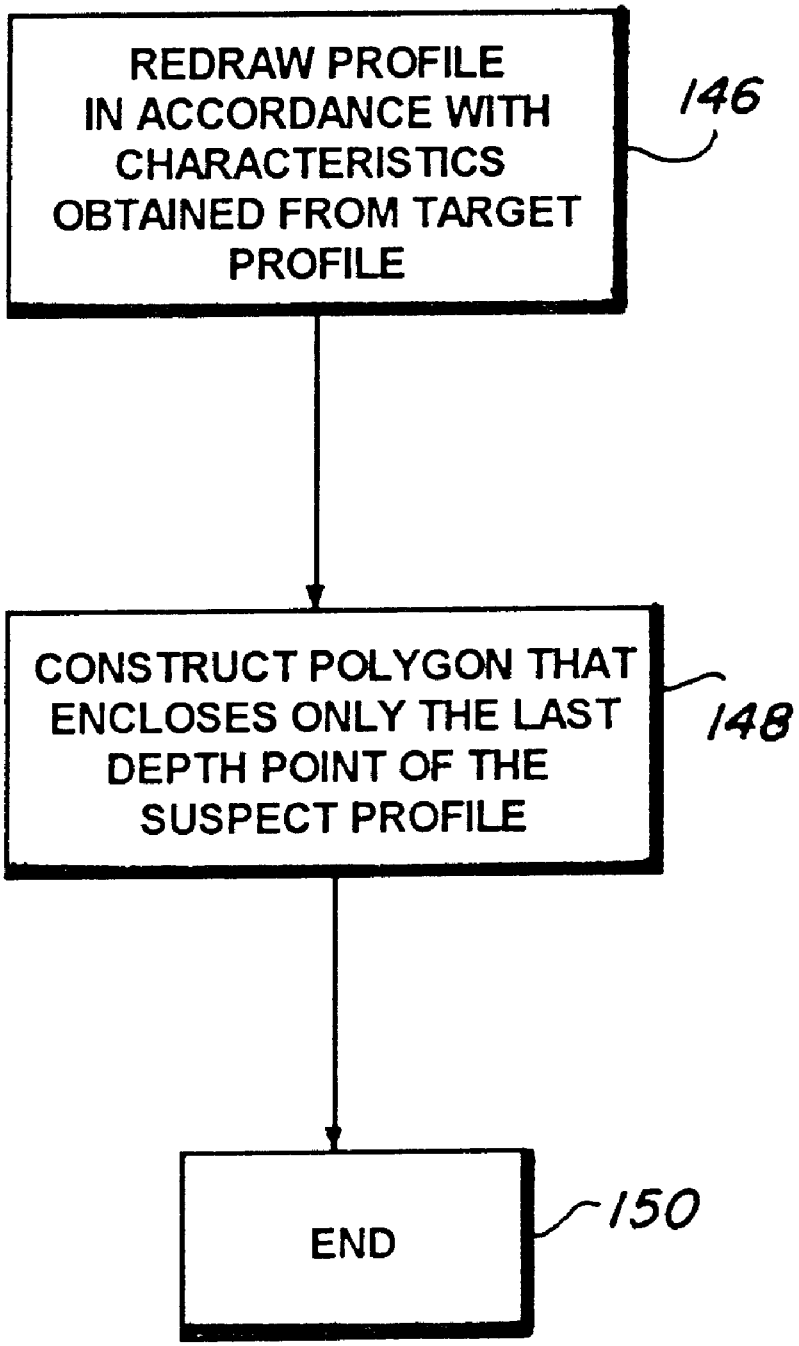

The NIDAS 10 has a display means 17 for displaying latitude and longitude parameters (see FIG. 3(*a*)) that define regions of interest, and temperature versus depth parameters (see FIG. 3(*b*)) correlatable to the region of interest. The system 10 also provides zooming means to more clearly define an area of interest on the display means 17, and the system 10 also has means for drawing shaped polygons on the display means 17 to specify locations of the ocean profiles and vertical segments of the ocean profiles. The polygons are frequently used to draw regularly shaped polygons to "capture" the location of ocean profiles or vertical segments of the profiles themselves. The polygons are also drawn to isolate interesting features in ocean profiles; observe whether locations are clumped together (indicating that the feature is particular to a localized region in a specified window of the display), or spread out to indicate that the feature varies in time. The polygons provided by the NIDA system 10 can perform polygon queries in both a spatial window (latitude/longitude) and a data window (temperature versus depth, sound versus depth, etc.) in a timely manner. The zoom means and the means for drawing shaped polygons are known in the art and provide interactive devices which are of importance to the present invention.

In general, the method of the present invention selects a target region of interest and displays the latitude and longitude parameters and the temperature versus depth parameters in the target region of interest. The method then selects the LLT parameters having temporal boundaries for the target region of interest. The method then selects the center date of the temporal boundaries within a range of dates before and after the center date. The method then selects the MOODS for the target region of interest and then the display means, in response to operating routines, draws the selected LLT parameters on the display means and also draws the selected MOODS for the target region of interest on the display means. The zooming means is then used to display the LLT parameters that are apparent boundaries of the region of interest. The polygon means are then used to select two profiles separated from each other but still within the target region of interest having the apparent boundaries so as to gain appreciation that the selected LLT parameters and the MOOD are actually both in the same region of interest. The method continues by selecting the polygon means to first gain appreciation that the ocean property desired to be analyzed is in the region of interest and then continues to use the polygon queries to definitively determine the analysis of the ocean property of the region of interest. The ability of the zoom means and the polygon means to be responsive to the operator commands are supplied by appropriate operating routines, herein referred to as computer configuration operating routines 14, being run in the computer 12.

The computer 12 may be a Sun Microsystems Sparc Station Model 10 computer hardware environment having an operating system of SunOS version 4.1.3, including the resident SUN C compiler.

The computer configuration operating routines 14 comprise a data retrieval module (DRM) 20, a graphical user interface 1 (GUI 1) 22, a graphical user interface 2 (GUI 2) 24, and a data interactive module (DIM) 26. The routines 20, 22, 24 and 26 have bidirectional communication paths as indicated by directional arrows 28, 30, 32, 34, 36, 38 shown in FIG. 1. The computer configuration operating routines 14 comprise the master control program that runs the system 10 of the present invention, and is loaded when the computer is turned on and resides in memory at all times. However, if desired other routines may be utilized in the practice of the present invention so long as interactive graphic techniques are provided in accordance with the principles of the present invention to be described.

The data retrieval module (DRM) 20 manages access to and communications with an internal relational database management system that links files 18 together as required. In addition, the data retrieval module (DRM) 20 prepares simple data displays that conform to user selectable options and passes them to the graphical user interface 1 (GUI 1) 22 for presentations in a window on the display means 17. When a data display is designated for interactive manipulations, it is passed to the data interactive module 26 by way of the graphical user interface 1. The data retrieval module 20 receives data management instruction from the graphical user interface 1 and translates, as required, instructions into a structured query language (SQL) format, known in the art, that is routed to the relational data management system. The data retrieval module 20 is also responsible for allocating internal memory space for data retrieved from the database or data designated for database ingestion.

The graphical user interface 1 (GUI 1) 22 supports and manages the links between the user 18 and the system 10. The system 10, as to be described, provides displays, via display means 17, to the user for interpretation and interactive response.

The graphical user interface 2 (GUI 2) exercises direct and centralized control over the data retrieval module (DRM) 20 and the data interactive module (DIM) 26; monitors activities of the data retrieval module (DRM) 20 and the data interactive module (DIM) 26 by way of external interfaces; interprets and routes user interactive commands; provides status information and feedback to the user 16; preferably provides a windowing environment for visualizing of data, displays control elements, and intercepts user interactive commands; and receives the interprets user input by way of the keyboard or a mouse pointing device. The interaction created and encouraged by the routines being executed in the computer 12 is to be further discussed hereinafter with reference to FIG. 4.

The data interactive module (DIM) 26 modifies and manipulates the data in response to the user interactive commands. The data interactive module (DIM) 26 supplies the graphical user interface (GUI 1) 22 controlling a main window display; to be further described hereinafter with reference to FIG. 3, with real time, and updated data displays that reflect user's interaction.

The system 10 is an interactive system and is always in the event-driven state. As with all event-driven applications, the system 10 assumes either of two executing states (modes); processing and rest (idle). The system 10 default state is the rest mode. When not processing data in response to user input, the system 10 automatically reverts to the rest mode and waits for the next user command or input. The functional connectivity of the elements within the system 10 may be further described with reference to FIG. 2.

Figure 2:
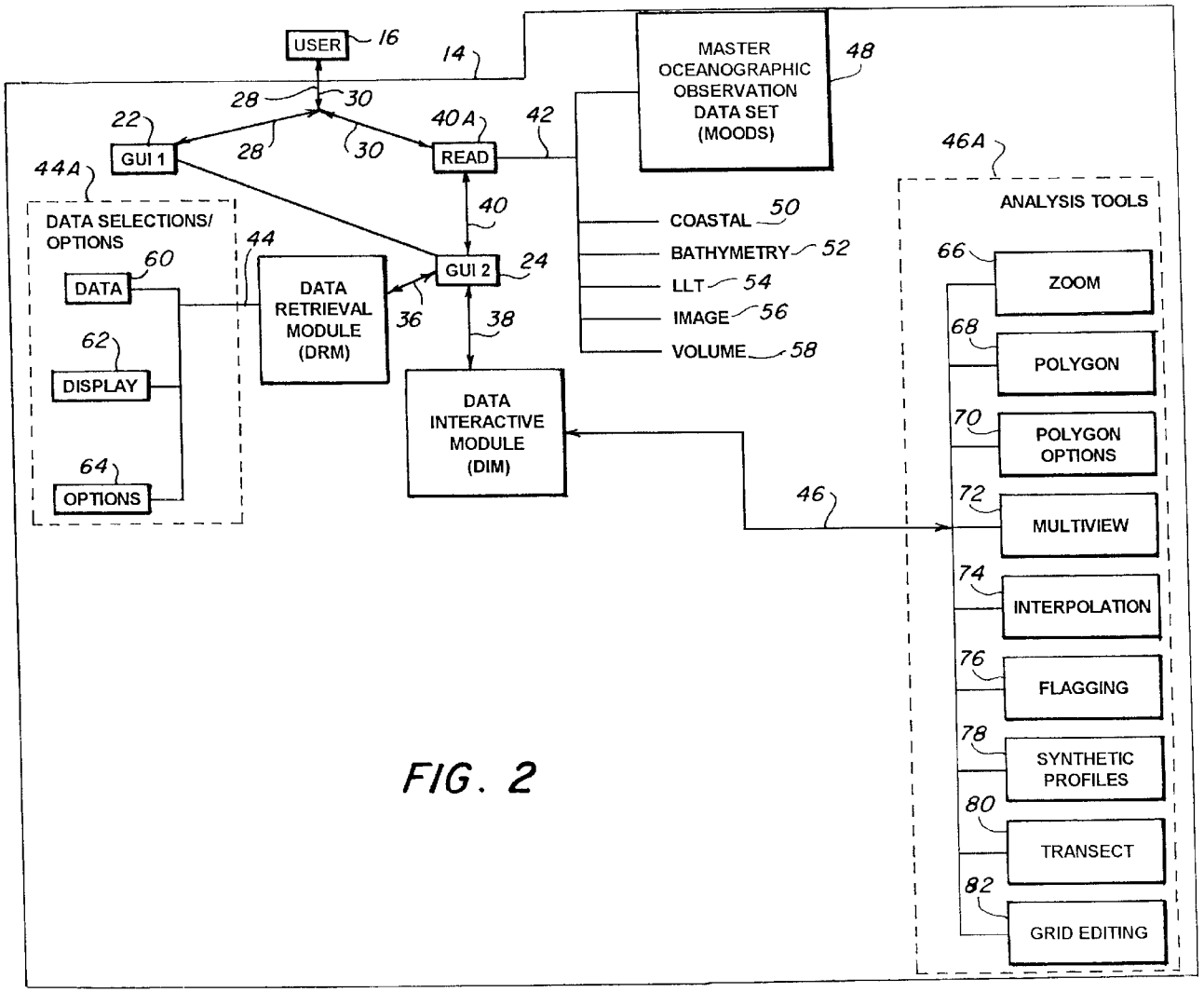
FIG. 2 illustrates the functional connectivity of the program segments of the present invention.

FIG. 2 shows the plurality of directional arrows shown in FIG. 1, but in addition thereto shows a directional arrow 40 providing bidirectional communications between a read program segment 40A and the graphical user interface 2 (GUI 2). Further, FIG. 2 illustrates data busses 42, 44 and 46. The information accessible on data busses 42, 44 and 46 is operator selectable. The accessible information on data busses are to be described in a limited manner but with enough details to describe the principles of the present invention.

The bus 42 provides data retrieval, display and manipulation of accessible information from program segments MOODS 48 (previously discussed), coastline 50, bathymetry 52, LLT 54 (previously discussed), image 56 and volume 58; with the program segments 50, 52, 54, 56 and 56 being selectable by pushbuttons or by options of display menus.

Coastline 50 provides for the selection between four kinds of coastlines. Bathymetry retrieves data from the database in accordance with parameters contained in the regions selected, to be further described. Image 56 retrieves a list of images and dates. Volume 58 retrieves information about various versions of selectable data.

The data bus 44 retrieves, displays and manipulates data selection comprising data 60, display 62, and options 64. The data 60 creates and displays a data selection window for the LLT data types and allows for specifying the minimum and maximum values for latitude, longitude, time, classification, month, parameters, cruise identification, instrument type, source, and water temperature. The display 62 is selected to activate the LLT dataset. The option 64 is selectable for a specific LLT dataset where various parameters for the LLT data type can be set to desired values.

The data bus 46 services analysis tools 46A comprising zoom 66, polygon 68, polygon option 70, multiview 72, interpolation 74, flagging 76, synthetic profile 78, transect 80 and grid editing 82. The zoom 66 and the polygon 68 tools are operator interactive devices comprising pushbuttons that operatively cooperate with a mouse device used in window type display environments. For the sake of brevity, the description hereinafter refers only to pushbuttons for the zoom 66 and polygon 68 tools and not to the operator's manipulation of the mouse device. When the zoom pushbutton is activated it allows for the operator to draw a rectangle. The polygon pushbutton 68 is selected and computer routines prompt the user to draw the polygon. The polygon option 70 is a pushbutton and when activated displays a pop-up dialogue to facilitate setting of the polygon options such as vertex color, edge color, vertex size, edge line width and vertex symbols. The multiview pushbutton 72 allows for profiles to be displayed in different windows, such as those displayed as shown in FIG. 3 to be further described hereinafter. Interpolation pushbutton 74 creates displays with different interpretation routines. The flagging pushbutton 76 may be used to create ten (10) different flag toggles so as to earmark and update the database for each data set selected. The transect pushbutton 80 checks for the presence of data and assists in drawing end points of the data. The grid editing pushbutton 82 is used to edit a particular grid that may be selected.

The system 10 of the present invention performs various types of analysis of ocean properties of the temperature and salinity (and derive parameters of sound speech, density and conductivity). Three basic analysis are: (1) investigate spatial variations of ocean properties for a specific ocean base; (2) investigate temporal variations of ocean properties for a specific ocean basin; and (3) perform editing of ocean temperature data. Further, the system 10 of the present invention performs at least four additional analysis which are: (1) reconstruct ocean temperature/salinity conditions during a passed "event" (such as a Naval exercise to determine why sonars or other sensors perform well or poorly); (2) construct 3-D gridded data bases of temperature/salinity to interface to "tactical decision needs" (software/hardware systems) on board naval ships and submarines; (3) evaluate near-real time ocean temperature models; and (4) investigate vertical correlation sea-surface temperatures (derived from the satellite observations) and sub-surface temperature properties. The system 10 operates in a similar manner for all its applications in that it allows for appropriate editing of observed ocean data based on a priori knowledge and operator insight so as to derive accurate ocean profile data. In general, the method of the present invention utilizes interactive graphical techniques for an operator to analyze ocean data under consideration including temperature, salinity and other related properties such as sound speed, density and conductivity. The method comprises the steps of displaying the ocean data under consideration; reviewing of the originally displayed data by an operator employing deductive reasoning; changing the displayed data by interactive graphical techniques in response to the operator's deductive reasoning; reviewing the changed displayed data by the operator employing deductive reasoning for a second time; and continue changing the display data by the interactive graphical technique in response to the operator's deductive reasoning until the deductive reasoning of the operator determines that the display data satisfies the analysis expectation of the operator.

The principles of the methods of operation of the system 10 may be further described with reference to FIGS. 3 and 4, wherein FIG. 3 is composed of FIGS. 3(*a*) and 3(*b*) that cumulatively illustrate a typical display on the display means 17. FIG. 3(*a*) illustrates a representation of a target region of interest and FIG. 3(*b*) illustrates temperature versus depth profiles for the target region of interest of FIG. 3(*a*). FIG. 4 illustrates an overall sequence 88 to perform the first three mentioned applications related to spatial variation, temporal variation, and editing of ocean basin data.

FIG. 4 is composed of FIGS. 4(*a*), 4(*b*), 4(*c*), 4(*d*), 4(*e*), 4(*f*), and 4(*g*), each of which illustrates one or more program segments of the computer configuration operating routines 14 being run in computer 12. The analysis samples shown in FIG. 4 are illustrated of one specific application, that is, for the Yellow Sea and adjacent east China Sea during selected months, that is, for July through September.

The overall operation 88 is established by event 90 which causes the system 10, in particular, the computer configuration routines 14 to be launched, that is, to be loaded and then control is passed to program segment 92.

Program segment 92, in response to operator commands, selects the target region of interest which, for example is the Yellow Sea and then passes control to program segment 94.

Program segment 94 occurs when the LLT is selected by the operator. At this stage in the overall sequence 88 the latitude, longitude, and time parameters are selected. Upon completion of the conditions occurring in program segment 94, the control is passed to the program segment 96.

Program segment 96, in response to operator commands, selects MOODS and then passes control to the program segment 98 which selects the minimum month which, for this example, is July. After the conditions of program segment 98 are satisfied, control is passed to program segment 100 shown in FIG. 4(*b*).

Program segment 100, in response to operator commands, selects the maximum month which, for this example, is September and then passes control to program segment 102 which calculates the center date related to the minimum and maximum month's of programs 98 and 100, respectively. Upon completion, program segment 102 passes control to program segment 104.

Program segment 104, in response to operator commands, selects the base time range which, for this example, is 30 days and which relates to the time before and after the calculated center date of program segment 102. Upon completion, program segment 104 passes control to program segment 106.

Program segment 106, in response to operator commands, creates MOODS location and MOODS profile and then passes control to program segments 108 and 110 (see FIG. 4(*c*)) which respectively plot (see FIG. 3(*a*)) a graphic location point for each MOODS observation and a MOODS profile (see FIG. 3(*b*)) for each MOODS observation. When program segments 108 and 110 are complete, control is passed to program segment 112.

Program segment 112, in response to operator commands, selects the zoom pushbutton routines to define the apparent boundaries of the target region of interest which, for example, is the Yellow Sea. The zoom pushbutton allows the operator to achieve a closer representation of the target region of interest so that the operator by using his/her own deductive reasoning, sometimes referred to as a priori knowledge, can scrutinize the apparent boundaries. These apparent boundaries serve as a priori knowledge for the person performing the analysis so that he/she can better appreciate if the correct parameters are being displayed (see FIGS. 3(*a*) and 3(*b*)). The zoom pushbutton allows for the geographic location point for each MOOD observation plotted in FIG. 3(*a*) and for each MOOD profile plotted in FIG. 3(*b*) to be more fully examined by being within the rectangle comprising the zoomed-in region. Upon completion, program segment 112 passes control to program segment 114.

Program segment 114, in response to operator commands, selects the polygon pushbutton routines which are used to define the polygon region of interest. The operation of the polygon pushbutton causes all profiles located in the polygon region of interest to be colored red so as to distinguish them from other profiles in FIG. 3(*b*). The polygon region of interest is used by the operator in a manner similar to the region defined by zoom pushbutton in that it allows the operator to more freely exercise his/her deductive reasoning in this interactive graphic technique of the present invention. Upon completion, program segment 114 passes control to program segment 116.

Program segment 116 allow for the depiction of different temperature profiles characteristics at their geographical location and in order to accomplish this, two polygons are created; one in the northern portion of the Yellow Sea, and the other in the southern portion of the Yellow Sea. The difference in temperature profiles are clearly depicted especially at depths below 50 meters. The more northerly profiles are (generally) colder than those further south. Again this interactive graphic visual comparison gives the operator who is performing the analysis to gain a better appreciation of the parameters being analyzed. More particularly, program segment 116 gives the operator a better appreciation of the first analysis method of FIG. 4, that is, to investigate the spatial variation of ocean properties for a specific ocean basis. Upon completion, program segment 116 passes control to program segment 118.

Program segment 118, in response to operator commands, allows the user to gain appreciation of the geospatial temperature variations by creating polygons in random areas defined by the polygons of segments 108 and 110 which results in that the operator may note how the temperature versus depth plot in FIG. 3(*b*) varies dependent upon the geospatial location within the polygon. Upon completion, program segment 118 passes control to program segment 120 of FIG. 4(*d*).

Program segment 120, in response to operator commands, creates a polygon to enclose the most concentrated group of locations which results in all MOOD observations within the new polygon to be replotted in a particular color, such as RED in FIG. 3(*a*). The operator may note that the observations plotted in red in FIG. 3(*b*) generally have a similar shape which is characteristic of the region enclosed in the polygon. Upon completion, program segment 120 passes control to program segment 122 which repeats program segment 120 so as to create a window that encloses the most cluttered group of profiles that are now plotted in RED. The better results are achieved by constructing polygons in the FIG. 3(*b*) that are preferentially located at the periphery where the profiles are representative of the warmest/coldest surface temperature. The interactive graphic techniques allow the operator to employ his/her deductive reasoning so as to keep reduces the possible unknowns until he/she determines the correct analysis. These interactive graphic techniques so far described with reference to FIG. 4 allow the operator to investigate and determine the spatial variation of ocean properties of a specific ocean basis which, for example, corresponds to the target region of interest, i.e., the Yellow Sea. Upon completion, program segment 122 passes control to program signal 124 which begins the analysis of investigating temporal variations of ocean properties for a specific ocean basis which, for example, is the Yellow Sea.

Program segment 124, in response to operator commands, constructs a polygon in the central region of interest which is the Yellow Sea which results in the FIGS. 3(*a*) and 3(*b*) being updated by program segment 126 so that the observations within the polygon are replotted using different colors which are assigned, for example, as follows: Red to indicate those observations whose dates are within the 15 days of the center date; GREEN to indicate those observations taken between 15 and 30 days before the center date; and BLUE to indicate those observations taken between 15 and 30 days after the center date whose gathering is controlled by program segment 126. The interactive graphic technique provided by program segment 124 allows the operator to use his/her deductive reasoning to analyze and investigate the temporal variations of the ocean properties for a specific ocean basis, for example, the Yellow Sea. Upon completion, program segment 126 passes control to program segment 128 shown in FIG. 4(*e*).

Program segment 128, in response to operator commands, constructs a polygon to enclose MOODS observations of FIG. 3(*a*) and 3(*b*) that have been plotted over land. The majority of these observations of FIG. 3(*b*) have a similar structure below 100 meters in FIG. 3(*b*). These observations should take into account that the below 100 meters, temperatures between 7 and 12° C. are indicative that they have been taken near 120 west longitude (California coast) instead of 120 east longitude (Yellow Sea). If such occurs it should be taken as an error coding. Upon completion, program segment 128 passes control to program segment 130.

Program segment 130, in response to operator commands, constructs a polygon around a bundle of observation having temperatures between 7 and 10° C. at depths between 125 and 175 meters. If such a polygon can be constructed it is indicative that the data is related to the coast of California, rather than the Yellow Sea which is the target region of interest for the particular example of FIG. 4. The interactive graphic techniques provided by program segments 128 and 130 allows the operator to discover unwanted data and discard the misleading information so that the operator by using his/her deductive reasoning allows the operator to edit in or out ocean temperature data. Upon completion, program segment 130 passes control to program segment 132.

Program segment 132, in response to operators commands, constructs a polygon for the MOOD observations that are suspiciously outside what might be considered the envelope of the target profiles. The operator may use his/her deductive reasoning in a manner similar to that described for program segments 128 and 130 to uncover suspicious data. Again, these observations are accomplished by the user having a priori knowledge. Program segment 132 provides an intuitive area by constructively and successively creating smaller and smaller polygons for a smaller and smaller group to define a desirable target region of interest. Upon completion, program segment 132 passes control to program segment 134.

Program segment 134, in response to operator commands, constructs a polygon which defines boundaries of 36 North (N), 34 North (N), 125 East (E) and 127 East (E) and causes the associated profiles in FIG. 3(*b*) to be indicated by a RED color. It should be noted that a conspicuous observation for these boundaries, gained by a priori knowledge, is that the profile maintains a constant temperature near 26° C. and between 50 and 200 meters in depth. Upon completion, program segment 136 passes control to program segment 138 shown in FIG. 4(*f*).

Program segment 138, in response to operator commands, and in a manner similar to program segment 136, constructs successively smaller and smaller polygons so as to enclose the target profile corresponding to that of the target region of interest. The smaller polygons are instrumental in discovering that the target profile is located near 120 E latitude and between 34N and the South Coast of the Korean Peninsula. Upon completion, program segment 140 passes control to program segment 142.

Program segment 142, in response to operator commands, selects a current data set list and ascertains if the determined target profile is therein. The target profile observation, for example, should have a last depth below 200 meters and an examination of the profiles located in the list is accomplished and such analysis should discover that the target profile was provided by a particular cruise gathering the data and having last-depth of, for example, 2134.00 meters. Such a matching of the characteristics to the current data list is accomplished by program segment 144 in response to operator commands. Upon completion, program segment 144 passes control to program segment 146 of FIG. 4(*g*).

Program segment 146 redraws the profile in accordance with the characteristics obtained for the target profile, both the redrawing being rendered for FIGS. 3(*a*) and 3(*b*). Upon completion, program segment 146 passes control to program segment 148.

Program segment 148 constructs the polygon and encloses only the last depth point of the suspect profile which has been determined to be the target profile and, thus, a successful analysis of the ocean property of interest of the target region of interest. Upon completion, program segment 148 passes control to program segment 150 which represents the end of the program outlined in FIG. 4.

It should now be appreciated that the practice of the present invention provides for a system that utilizes interactive graphic techniques to allow for a back-and-forth dialogue with computer displays so that an oceanographer may be allowed to process and analyze ocean properties including profile data of a region of interest.

It should be further appreciated that the practice of the present invention allows for the analysis of profile data associated with shallow water, such as that for the Yellow Sea.

Although certain features of the invention have been illustrated and described herein, many modifications and changes will occur to those skilled in the art. It is, therefore, to be understood that the appended claims are intended to cover all such modifications and changes that fall within the true spirit of the invention.

What is claimed is:

1. A method utilizing interactive graphical techniques for an operator to analyze ocean data under consideration including temperature, salinity and other related properties such as sound speed, density and conductivity, said method comprising the steps of:

(a) displaying the ocean data under consideration;

(b) reviewing the originally displayed data by an operator employing deductive reasoning;

(c) changing the displayed data by interactive graphical techniques in response to the operator's deductive reasoning;

(d) reviewing the changed displayed data by said operator employing deductive reasoning for a second time; and (e) continue changing the display data by said interactive graphical technique in response to the operator's deductive reasoning until the deductive reasoning of said operator determines that the display data satisfies the analysis expectation of said operator.

2. A method utilizing interactive graphic techniques for the analysis of ocean properties of a target region of interest comprising the steps of:

(a) providing a bank of data termed MOODS comprising observed ocean temperature and salinity profiles with the temperature profiles comprising sets of observations of temperature versus depth parameters both collected nearly simultaneously;

(b) providing latitude, longitude and time (LLT) parameters having temporal boundaries and serving as a generic data category for ocean profiles;

(c) providing display means for displaying latitude and longitude parameters that define regions of interest and temperature versus depth parameters correlatable to said regions of interest;

(d) providing means for drawing shaped polygons on said display means to specify locations of ocean profiles and vertical segments of ocean profiles;

(e) providing zooming means to more clearly define an area of said display means;

(f) selecting a target region of interest and displaying latitude and longitude parameters and temperature versus depth parameters of said region of interest;

(g) selecting said LLT parameters having temporal boundaries for said target region of interest;

(h) selecting the center date of said temporal boundaries and a range of days before and after said center date;

(i) selecting said MOODS for said target region of interest;

(j) drawing said selected said LLT parameters on said display means;

(k) drawing said selected MOODS for said target region of interest on said display means;

(l) selecting zooming means and zooming in on said displayed LLT parameters that are apparent boundaries of said region of interest;

(m) selecting polygon means to create two profiles on said display means separated from each other but still with the target region of interest having said apparent boundaries so as to gain appreciation that said selected LLT parameters and said MOOD are both in said region of interest; and (n) continue selecting said polygon means to first gain appreciation that the ocean property desired to be analyzed is in said target region of interest and, then to definitively determine the analysis of said ocean property.

* * * * *